United States Patent Office 2,772,249
Patented Nov. 27, 1956

2,772,249
AIR CURING COATING COMPOSITION AND METHOD OF PREPARING SAME

Edward Cousins, Akron, and Frank A. Jeffries, Cuyahoga Falls, Ohio, assignors, by mesne assignments, to The Goodyear Tire & Rubber Company, a corporation of Ohio No Drawing. Application September 6, 1951, Serial No. 245,428

4 Claims. (Cl. 260—31.2)

This invention relates to an improved process for preparing erosion-resistant coating compositions and to methods of applying said compositions to erodible structures.

The problem of erosion due to wind and rain has become very acute in the operation of aircraft and guided missiles capable of traveling at tremendous speeds. As speeds mount, the problems of fabricating erosion-resistant structures increase may-fold. Raindrops are particularly destructive to such surfaces as those of aluminum, magnesium, steel and fabricated resinous laminated structures.

The problem is especially acute with respect to radar housings on aircraft and guided missiles and this invention will be described more particularly in connection therewith. For these housings, materials must be employed which, while providing the requisite resistance to erosion, will not interfere with the functioning of the radar apparatus by attenuating the radar waves.

It is accordingly, an object of this invention to provide an erosion-resistant coating for structures subject to erosion. It is another object of this invention to provide a coating composition which can be applied to structures to impart erosion resistance thereto. Still another object of the invention is to provide a method of coating structures to minimize erosion thereof.

Various types of coatings have been applied in attempts to minimize erosion of the surfaces of airborne vehicles but none of these has been satisfactory, and particularly is this true with respect to coatings for radomes. Such a coating should be tough and abrasion-resistant but must not affect the functioning of the radar equipment enclosed by the radome. Also, the surface should be as smooth as it is possible to attain since the slightest irregularity constitutes a point of weakness where erosion may commerce. Furthermore, from the point of view of applying the coating, present coatings require heat treatment subsequent to application and this is inexpedient where large surfaces are involved. For repairs in the field, such coating cannot be utilized at all.

The coating compositions of this invention are elastomeric in nature comprising neoprene (polymerized chloroprene) compounded in a manner to avoid or overcome the foregoing difficulties in all respects and therefore constitute useful improvements in the coating field. The new neoprene compositions are air-curing and therefore can be applied in the field without special equipment. Air curing means the capability of becoming vulcanized or cured at the temperature of surrounding air or atmosphere, e. g., 70° F. more or less, without the application of additional heat. This makes it possible to renew repeatedly the surface of a radome or other portion of an airplane which may have become roughened by the elements and require renewal of the erosion-resistant surface before the next flight. Also, the new compositions cure to the non-tacky stage in a relatively short time, permitting treated structures to be handled and stored in minimum time with consequent efficiency in the utilization of manufacturing space.

The invention will be described more particularly with respect to the following examples, which are herein set forth for purposes of illustration:

Example I

A cement was prepared of the following composition, all parts being by weight:

| | Parts |
|---|---|
| Neoprene CG | 100 |
| Magnesium oxide | 4 |
| Phenyl beta naphthylamine | 2 |
| Benzothiazyl disulphide | 2 |
| Fumed silica | 25 |
| Total | 133 |

These components were mixed together and dispersed in an medium consisting of 128 parts of toluene and 128 parts of amylacetate. To the dispersion was added 1 part of piperidinium pentamethylene dithiocarbamate, a total of 390 parts by weight. This composition can be stored in containers for a considerable period of time, if desired.

Another cement was made up consisting of 50 parts by weight of catechol dissolved in 634 parts by weight of benzene and 60 parts by weight of denatured alcohol. The catechol will cause the above-described composition to cure at room temperatures and, therefore, is not mixed with the neoprene base cement until just prior to use. The catechol solution was mixed with the neoprene cement in the ratio of 2 parts by weight of catechol to 100 parts by weight of neoprene or 29.8 parts by weight of the solution of catechol in the solvent made of 91.4% by weight of benzene and 8.6% by weight of ethyl alcohol to 390 parts by weight of neoprene cement.

A radome having Fiberglas surfaces was now prepared for coating with the composition. This was accomplished by lightly sanding the outer surface and wiping clean with a lint-free cloth, followed by washing with toluene. Thereafter 4 primer coats of neoprene cement were sprayed on the previously prepared surface at 10 to 15-minute intervals.

The split components of the cement described above were now mixed together and applied within a few hours on the radome, successive coats being applied until a total thickness of about 10 mils was reached. Tackiness had substantially disappeared 2 hours after application and the air course was completed at room temperature after a period of 72 hours. The coating was extremely uniform with no voids caused by entrapped air. Water absorption was only 7.2% in 24 hours, a substantial improvement in this respect over any previously prepared coating composition. Water absorption is an important factor in the production of radomes for the reason that such absorption interferes with transmission of radar waves through the structure.

The following is the formulation in parts by weight for another neoprene cement found operable for the purposes of this invention.

Example II

| | |
|---|---|
| Neoprene CG | 100 |
| Zinc oxide | 5 |
| Magnesium oxide | 4 |
| Phenyl beta naphthylamine | 2 |
| Benzothiazyl disulfide | 2 |
| | 113 |

The neoprene stock was added to 212 parts toluene by weight along with 1 part piperidinium pentamethylene dithiocarbamate in the same manner as shown in Example I. A solution of catechol in benzene was added to the neoprene cement in an amount to supply 2 parts catechol per 100 parts neoprene by weight.

The product prepared according to the teachings of this invention as illustrated by Example I has been tested by the Laboratory of the Air Materiel Command and the Cornell Aeronautical Laboratory. The following table illustrates the erosion comparison between conventional uncoated laminated structures, and structures coated with the product prepared according to the teachings of this invention. The tests were performed by mounting the test sample to a rotating arm such as a propellor blade and spraying the same with water. In the Air Materiel Command tests, the apparatus was mounted in a horizontal fashion and the water was sprayed in a horizontal direction. In the Cornell Aeronautical Laboratory test, the apparatus was mounted in a vertical direction and the water was allowed to fall in a vertical pattern.

ROTATING ARM TESTS

|  | A. M. C. Rotated at 265 m. p. h. | C. A. L. Rotated at 250 m. p. h. | C. A. L. Rotated at 500 m. p. h. |
| --- | --- | --- | --- |
| Uncoated laminate | slight damage after 2-3 hours. | 1 ply eroded after 25 min. | 2-3 plies eroded after 1½ min. |
| The product of this invention. | no damage after 13 hours. | eroded in 5-6 hours. | eroded in 400 minutes. |

The ingredients employed in the foregoing examples have been found to give best results for use in coating radomes but modifications may be made in the described compositions. Thus, neoprene AC or neoprene CG is preferred as the rubber-like base, these being soluble plastic sulphur-modified polychloroprenes prepared by the polymerization of chloroprene containing small amounts of sulphur and treated with tetraethyl thiuram disulphide. However, any type of neoprene may be used. Fumed silica is preferred as the reinforcing pigment since it is efficient in raising the energy of rupture content of the compound while having low electrical loss characteristics so that it does not affect the functioning of radar equipment. Other forms of silica may be employed as well as other pigments having low electrical loss characteristics as evidenced by their low dielectric constants, low power factors, and low conductivities. Pigments having high electrical loss characteristics such as carbon black, the most widely used reinforcing pigment for rubber are not recommended nor can metallic oxides be present in an amount exceeding approximately 10 parts by weight per 100 parts of neoprene if the coating composition is to be used in an installation housing radar equipment. If the coating composition is to be applied to structures in which radar equipment is not to be housed, other reinforcing pigments may be employed such as carbon black, the metallic oxides, magnesium silicate, magnesium carbonate, calcium carbonate, acetylene black, and graphite.

It will be apparent that the phenyl beta naphthylamine may be substituted by other anti-oxidants such as diphenyl p-phenylene diamine, and poly trimethyl quinoline. Likewise, the medium employed for dispersion of the neoprene cement may be varied, as by the use of any of the following solvents alone or in admixture, xylene, highly aromatic petroleum products, butyl acetate, higher homologous acetates, higher alcohols, and silicone oil. The piperidinium pentamethylene dithiocarbamate may also be replaced, for example, by other conventional vulcanization accelerators such as other dithiocarbamates, the aromatic substituted guanidines such as diphenyl guanidine, the thiuram disulfides and the thiuram monosulfides.

The catechol employed to air cure the neoprene cement may be substituted by other air curing agents such as thiocarbanilide, butyaldehyde-aniline and the condensation product of butyraldehyde and mono butyl amine.

The coating composition may be applied in any convenient manner, as by brushing, dipping or spraying. If brushing is used, a light stroke and a minimum amount of brushing should be employed to insure uniformity and smoothness of the coating. For the same reason, if spraying is used, it may be desirable or necessary to dilute the final coat with an organic solvent. Several coats are applied in order to get the proper thickness, a thickness ranging from .004 to .020 inch generally sufficing to protect the structure against erosion. It is preferred to allow the coated structure to air-cure for about 72 hours prior to use, although curing is usually advanced far enough in a few hours to prevent tackiness so that freshly coated structures can be used in an emergency.

Although this invention has been described as being applicable to the construction of radar canopies, other uses for the coating composition have proved to be practical. Such uses include the coating of ship propellors to prevent cavitation due to sea water, coating of the under surface of automobiles to prevent pitting, coating the surfaces of aircraft de-icers, covering the leading edges of high-speed airborne vehicles, coating helicopter rotor blades, lining tanks, and preparing electrically non-conductive film. Other industrial applications for the product of this invention are possible such as the lining of containers for corrosive chemicals, and use as a base for heavy machinery in order to dampen sound vibrations. In such uses as the above, electrical transparency is not an important element and therefore various compounding ingredients such as carbon black and the various metallic oxides can be substituted for the fillers indicated in the examples.

While certain representative embodiments and details have been shown for the purpose of illustrating the invention, it will be apparent to those skilled in this art that various changes and modifications may be made therein without departing from the spirit or scope of the invention.

We claim:

1. A method of making a tenaciously adherable erosion-resistant fluid coating composition which is capable of being air-cured by exposure to the atmosphere at ordinary temperatures for a period of from 2 to 72 hours comprising the steps of preparing a composition comprising a polychloroprene, a fumed silica, a metallic oxide in an amount less than 10% by weight of the polychloroprene, the composition being dispersed in equal portions of toluene and amyl acetate, preparing another composition comprising a curing agent selected from the group consisting of catechol, thiocarbanilide, butyraldehyde-aniline, and the condensation product of butyraldehyde and monobutylamine, said curing agent being dissolved in benzene, and combining the curing agent component with the polychloroprene component immediately prior to use to produce said tenaciously adherable erosion-resistant composition said curing agent component being present in the amount of about 2% by weight based on the weight of said polychloroprene.

2. A method of making a tenaciously adherable erosion-resistant fluid coating composition which is capable of being air-cured by exposure to ordinary atmosphere for a period of from 2 to 72 hours comprising the steps of preparing a composition comprising a polychloroprene, a fumed silica, a metallic oxide in an amount less than 10% by weight of the polychloroprene, the composition being dispersed in equal portions of toluene and amyl acetate, preparing another composition comprising catechol dissolved in benzene, and combining the curing agent component with the polychloroprene component immediately prior to use in the proportions of about 2 parts by weight of catechol to 100 parts by weight of polychloroprene to produce said tenaciously adherable erosion-resistant composition.

3. A method of making a radome having a tenaciously adhering erosion-resistant surface about .004 inch to 0.20 inch thick comprising the steps of preparing a laminated reinforced resinous base, preparing a composition comprising a polychloroprene, a fumed silica, a metallic oxide in an amount less than 10% by weight of the polychloroprene dispersed in equal portions of toluene and amyl acetate, preparing another composition comprising a curing agent selected from the group consisting of catechol, thiocarbanilide, butyraldehyde-aniline, and the condensation product of butyraldehyde and monobutylamine, said curing agent being dissolved in benzene said curing agent being present in a proportion of at least 2% by weight based on the weight of said polychloroprene, and combining the curing agent component immediately prior to use with the polychloroprene component to produce said tenaciously adherable erosion-resistant composition, applying said tenaciously adherent erosion-resistant composition to said laminated reinforced resinous base and exposing the same to the atmosphere at ordinary temperatures for a period of 2 to 72 hours to effect an air-cure of said coating composition.

4. A tenaciously adherable air-curing coating composition capable of being air-cured by exposure to the atmosphere at ordinary temperatures for a period of 2 to 72 hours comprising a dispersion of 100 parts of polychloroprene, 4 parts of magnesium oxide, 2 parts of phenyl beta naphthylamine, 2 parts of benzothiazyl disulfide and 25 parts of fumed silica dispersed in a solvent comprised of 128 parts of toluene and 128 parts of amyl acetate; said dispersion being combined with 2 parts by weight of catechol dissolved in 27.8 parts of a solvent mixture consisting of 91.4% by weight of benzene and 8.6% by weight of ethyl alcohol.

References Cited in the file of this patent
UNITED STATES PATENTS

| | | |
|---|---|---|
| 2,428,252 | Stroh | Sept. 30, 1947 |
| 2,455,854 | Condi | Dec. 7, 1948 |

OTHER REFERENCES

Proceedings of The Rubber Technology Conference, 1938, London (pages 419–421).

Rubber Age, June 1950, (pages 317–322).